United States Patent [19]

Ferguson

[11] Patent Number: 4,849,047
[45] Date of Patent: Jul. 18, 1989

[54] VIBRATION DAMPER BONDING SYSTEM

[75] Inventor: Robert J. Ferguson, Marshall, Mich.

[73] Assignee: Simpson Industries, Inc., Litchfield, Mich.

[21] Appl. No.: 912,541

[22] Filed: Sep. 29, 1986

[51] Int. Cl.$^4$ .......................... B32B 31/26; B32B 35/00
[52] U.S. Cl. .................. 156/273.9; 156/274.2; 156/275.5; 156/275.7; 156/294; 156/321
[58] Field of Search ............... 156/83, 272.2, 272.4, 156/273.9, 274.2, 275.5, 275.7, 294, 321; 219/10.53

[56] References Cited

U.S. PATENT DOCUMENTS

| | | | |
|---|---|---|---|
| 3,387,839 | 6/1968 | Miller | 156/294 |
| 3,740,512 | 6/1973 | Mitchell et al. | 219/10.41 |
| 3,798,403 | 3/1974 | Mitchell et al. | 219/10.53 |
| 4,128,449 | 12/1978 | Kobetsky | 156/380 |

*Primary Examiner*—George F. Lesmes
*Assistant Examiner*—J. Davis
*Attorney, Agent, or Firm*—Beaman & Beaman

[57] ABSTRACT

A bonding system for assembling internal combustion engine crankshaft vibration dampers having an annular inertia ring mounted upon a hub by an elastomeric ring interposed between the inertia ring and hub. After assembly of the components, a thermosetting adhesive located between the elastomeric ring and the inertia ring and hub is heated to a bonding temperature by low frequency electrical induction. The damper components are mechanically clamped during heating and the elastomer is permitted to thermally expand. Heat is concentrated adjacent the adhesive to minimize thermal aging and degrading of the elastomer.

2 Claims, 2 Drawing Sheets

VIBRATION DAMPER BONDING SYSTEM

BACKGROUND OF THE INVENTION

Internal combustion engines commonly employ a vibration damper affixed to the front end of the crankshaft to absorb and dissipate torsional crankshaft vibrations during engine operation. Such crankshaft vibration dampers consist of a central hub keyed to the crankshaft exteriorly of the engine block having a circular periphery. An annular metal inertia ring circumferentially surrounds the hub periphery in radially spaced relationship thereto and the annular cavity between the hub and the inertia ring is filled with a vibration damping elastomer, usually rubber. The elastomer maintains the assembly of the inertia ring on the hub, and in some vibration damper constructions this assembly is created by friction forces by producing a stressing of the elastomer during assembly between the hub and inertia ring wherein the elastomer is "compressed" therebetween.

Also, in addition to prestressing the elastomeric material as it is introduced into the annular cavity between the hub and inertia ring, adhesive may be utilized to augment the assembly between the components. Such adhesives may be of the thermosetting type wherein heating of the vibration damper after assembly is required to heat the adhesive to a bonding temperature.

A conventional manner for assembling internal combustion engine crankshaft vibration dampers of the above type consists of the following steps:

A thermosetting adhesive is applied to the circumference of the hub flange and the inner surface of the inertia ring. These components are then placed within a jig in concentric relationship which defines an annular concentric cavity between the surfaces to which the adhesive has been applied.

An elongated strip of elastomeric material, usually rubber, is formed into a ring and is placed within the jig and is axially forced into the annular cavity between the hub and inertia ring. As the radial thickness of the rubber ring is slightly greater than the radial thickness of the cavity receiving the ring, the elastomer is prestressed (stretched), and tends to expand to its normal dimensions, but is confined by the hub and inertia ring producing frictional forces between the elastomer and the hub and inertia ring. These frictional forces will produce an initial mechanical assembly of the damper components.

The assembled damper is then removed from the assembly jig and placed upon a gage which is rotatable and "run out", i.e. possible eccentricity of the inertia ring relative to the hub is checked to assure that the inertia ring concentricity is within the acceptable tolerances.

The assembled damper is then placed within portable clamps which engage both the hub and inertia ring to prevent axial displacement therebetween. A plurality of clamped vibration dampers are placed upon a rack, and the rack includes spaced layers wherein air flow between adjacent dampers is permitted.

The rack of clamped dampers is then placed within a gas-fired convection oven wherein heat is circulated and the entire rack, vibration dampers and clamps are heated to approximately 300° F. Difficulty is often encountered in obtaining uniform temperature within the convection oven, and the rack is usually retained in the oven to assure that all of the vibration dampers achieve a temperature sufficient to bond the adhesive, which is approximately 250° F.

After heating, the rack is removed from the oven and allowed to cool to room temperature. Several hours are required to achieve such cooling.

After cooling, the vibration dampers are individually unclamped, and bonding of the adhesive to the elastomeric material, hub and inertia ring will have taken place.

The vibration dampers are again placed upon a rotatable gage and run out or concentricity checked. Thereafter, timing marks are embossed on the inertia ring and the damper is placed upon a rotating balancer, and balanced, and the balanced dampers are then boxed for shipment.

The aforedescribed method of bonding crankshaft vibration dampers is inefficient in that the individual clamping of the dampers, and unclamping, is time consuming. Additionally, as the convection oven heating system requires that the oven, rack, clamps and vibration dampers all be heated to a bonding temperature, energy is inefficiently utilized as the heat is only necessary to bond the adhesive, and the energy required to heat the oven, rack, clamps and portions of the hub and inertia ring remote from the elastomeric ring serves no purpose, and is wasted.

Further, the aforedescribed method utilizing the convection oven exposes the elastomer to a bonding temperature for a considerable length of time, and the effect of such heat on the elastomer over such duration accelerates "aging" of the elastomer and has a deleterious effect thereon.

Also, because of the heating of the entire assembly of the vibration damper, and clamps, concentricity between the inertia ring and the hub may vary before and after heating, and the two gaging operations are necessary to assure concentricity and quality of assembly.

In the practice of the invention heating of the thermosetting adhesive is now accomplished by low frequency electrical induction, and as described below, the use of electrical induction heating simplifies the assembly of vibration dampers for engine crankshafts. It is appreciated that induction heating has previously been utilized in the assembly of components utilizing adhesives, and typical disclosures of such induction heating systems are shown in U.S. Pat. Nos. 3,740,512; 3,798,403 and 4,128,449. However, such prior disclosures are not directed to the use of induction heating in the assembly of engine vibration dampers and do not suggest the advantages arising from the use of induction heating in the manufacture of crankshaft vibration dampers.

It is an object of the invention to provide a system for assembling internal engine crankshaft vibration dampers utilizing a thermosetting adhesive wherein electrical induction heating is employed to produce the adhesive bonding temperatures.

Another object of the invention is to provide a process for assembling crankshaft vibration dampers including an elastomer bonded to metal components wherein heating of a thermosetting adhesive is accomplished without adversely affecting the physical characteristics of the elastomer.

Yet a further object of the invention is to provide a system for assembling engine crankshaft vibration dampers utilizing an elastomer and a thermosetting adhesive wherein the steps of manufacture are simplified with respect to previous assembly procedures and wherein accuracy of assembly is maintained.

In the practice of the invention the vibration damper hub, inertia ring and elastomeric ring are assembled as previously described wherein the prestressing of the rubber ring will frictionally maintain the assembly of the components prior to bonding. The assembled damper is then placed upon a rotatable gage so that run out, i.e. concentricity of the inertia ring, may be checked. Thereafter, timing marks are stamped upon the damper, usually the inertia ring, and the damper is placed upon a rotatable balancer, and balanced. It will be appreciated that all of the aforementioned steps have taken place prior to bonding of the thermosetting adhesive initially applied to the hub and inertia ring surfaces engaging the elastomeric ring in contrast to the bonding procedure using the convection oven.

Thereupon, the balanced damper assembly is placed within electrical induction heating apparatus and the hub and inertia ring are firmly clamped therein to prevent relative axial displacement therebetween. Clearance is provided adjacent the ends of the elastomeric material whereby thermal expansion of the elastomer may occur during heating.

The clamped damper is then exposed to low-frequency high-alternating current electrical energy as generated by a water-cooled coil located below the damper. The coil is of such configuration that the resultant heating occurs primarily in the hub flange and in the inertia ring adjacent the elastomeric ring, and the current flow is continued for a duration, approximately one half minute, sufficient to heat the hub flange surface coated with the adhesive and the adhesive-coated inertia ring surface to a temperature sufficient to bond the adhesive to these surfaces and the elastomeric ring.

After heating, the damper is removed from the induction heating apparatus, which simultaneously unclamps the hub and inertia ring, and the damper may be directly placed within the shipping box or container wherein it cools to room temperature.

As the practice of the invention provides automatic unclamping and clamping of the hub and inertia ring while in the heating apparatus, these separate time-consuming steps are eliminated. Also, the practice of the invention, as compared to the previous steps of manufacture as described above, eliminates the second eccentricity gaging operation, and as cooling takes place after the damper has been boxed, and no operations are further required to the damper after heating, it is not necessary to wait for cooling to be achieved before further processing the dampers.

As compared with the prior system of assembling vibration dampers the practice of the invention concentrates the location of damper heating which requires less time per damper, utilizes less energy, and reduces the heating exposure of the elastomer minimizing the deleterious effects of the heat upon the elastomer.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
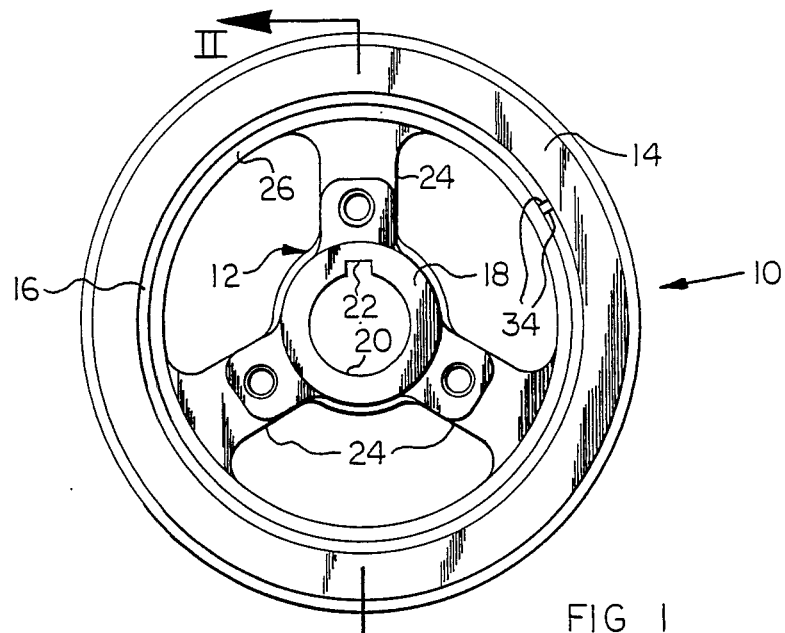
FIG. 1 is an axial, elevational view of an internal combustion engine crankshaft vibration damper assembled in accord with the practice of the invention.
Figure 2:
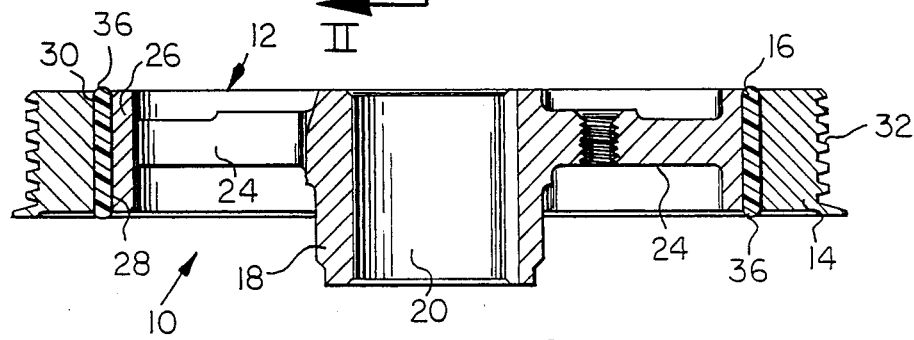
FIG. 2 is a diametrical, elevational, sectional view as taken along Section II—II of FIG. 1.
Figure 3:
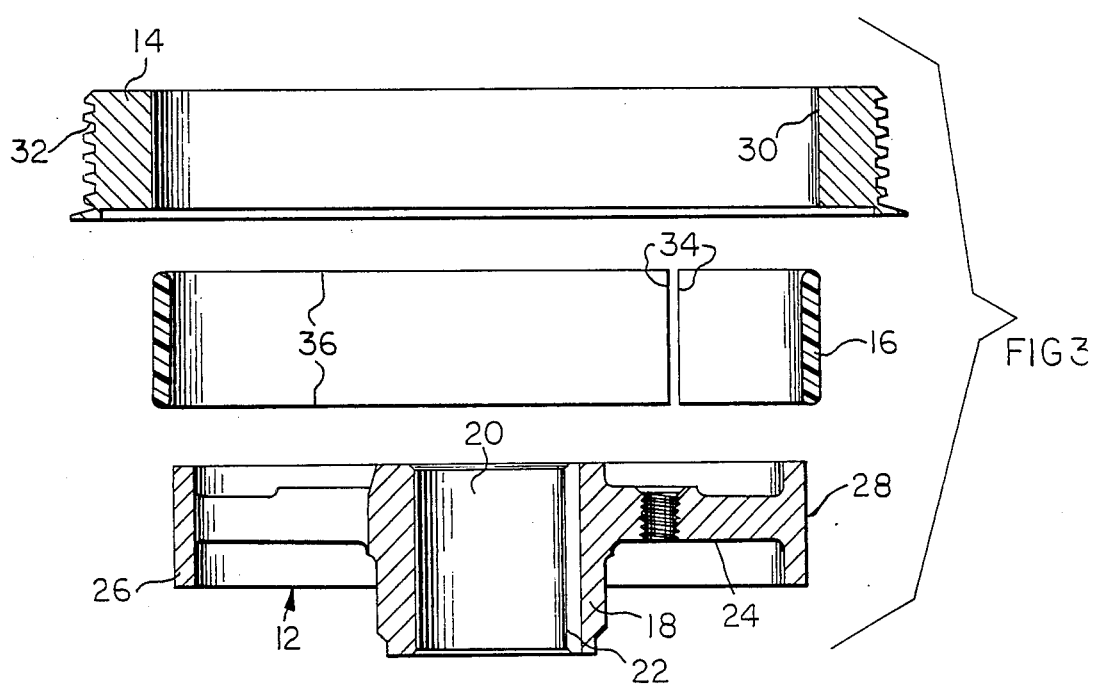
FIG. 3 is a diametrical, sectional, exploded view of the components of a vibration damper of the type assembled in accord with the practice of the invention.

A typical internal combustion engine crankshaft vibration damper which is assembled in accord with the concepts of the invention is shown in FIGS. 1-3. The damper 10 includes three primary components, a central metal hub 12, a metal inertia ring 14, and the hub and inertia ring are maintained in assembly by the elastomeric ring 16.

The hub 12 includes a central annular hub section 18 having an internal cylindrical bore 20 for receiving the front end of an engine crankshaft, not show. A keyway 22 located in the bore permits the damper to be keyed to the crankshaft. Radially disposed webs 24 extend from the central hub section 18 for supporting the cylindrical flange 26. The flange 26 is provided with a peripheral cylindrical surface 28 concentric with the axis of the bore 20.

The inertia ring 14 is of an annular configuration having an internal cylindrical surface 30 of a diameter greater than the diameter of the hub peripheral surface. The inertia ring usually includes an outer surface 32 which is formed with V grooves for receiving a drive belt which is used to drive the vehicle accessories, such as the alternator, air conditioner compressor, power steering pump, air pumps, and the like, not shown.

Assembly of the inertia ring 14 upon the hub 12 is accomplished by the elastomeric ring 16 which is interposed between the hub surface 28 and the inertia ring surface 30. Normally, the ring 16 is formed by a strip of rubber having a durometer of approximately 50, and the strip is provided with ends 34 and lateral edges 36. The normal radial thickness of the ring 16 is slightly greater than the radial dimension of the spacing between the hub surface 28 and the inertia ring surface 30 when the hub 12 and ring 14 are radially and axially concentrically aligned, such as shown in FIG. 2.

The hub 12, inertia ring 14 and elastomeric ring 16 are assembled in the relationship of FIG. 2 by placing the hub and inertia ring in a jig, not show, wherein the surfaces 28 and 30 will be in opposed aligned concentric relationship as shown in FIG. 2. Thereupon, the rubber ring strip 16 is located within the jig and formed in an annular configuration in alignment with the cavity defined by the surfaces 28 and 30 and is forced into the annular cavity between the surfaces 28 and 30 to establish the relationship shown in FIG. 2. During insertion of the rubber ring 16 the rubber ring is so supported that it may be axially forced between the hub and inertia ring surfaces, and due to the fact that the radial thickness of the rubber ring is slightly greater than the radial thickness of the annular cavity defined by surfaces 28 and 30 the rubber ring will be axially stretched and prestressed to permit entry into the annular cavity. The tendency for the rubber to return to its unstressed condition will firmly frictionally engage the rubber ring with the surfaces 28 and 30 providing a mechanical interconnection between the three components and maintain the assembly shown in FIG. 2.

Prior to the hub 12 and inertia ring 14 being located within the assembly jig, the surface 28 and the surface 30 are coated with a thermosetting adhesive capable of bonding rubber to metal. Acceptable adhesives for this purpose are commercially available from a number of sources and the particular adhesive forms no part of the invention. The adhesive may be applied by spray or brush, and will usually form a film thickness less than one mil. The adhesive is permitted to dry upon the surfaces 28 and 30 prior to assembly of the vibration damper, and the dried adhesive film is non-tacky and does not interfere with the assembly of the hub, inertia ring and elastomer strip. The adhesive is thermosetting and will bond to the rubber and metal surfaces at approximately 250° F.

In accord with the invention, after the hub 12, inertia ring 14 and rubber ring 16 have been assembled as shown in FIG. 2, the assembled damper is placed upon rotating gage apparatus, not shown, and the concentricity of the inertia ring 14 to the axis of hub 12 is checked. If the concentricity, i.e. run out, is within tolerances, timing marks are embossed upon the damper, usually upon a lateral side of the inertia ring 14, and the assembled damper is then placed in balancing apparatus which balances the damper by removing localized weight from the inertia ring by drilling recesses in the lateral sides thereof, as is well known. After balancing the assembled damper is then placed upon the induction heating apparatus 38 as disclosed in FIGS. 4–6.

Figure 4:
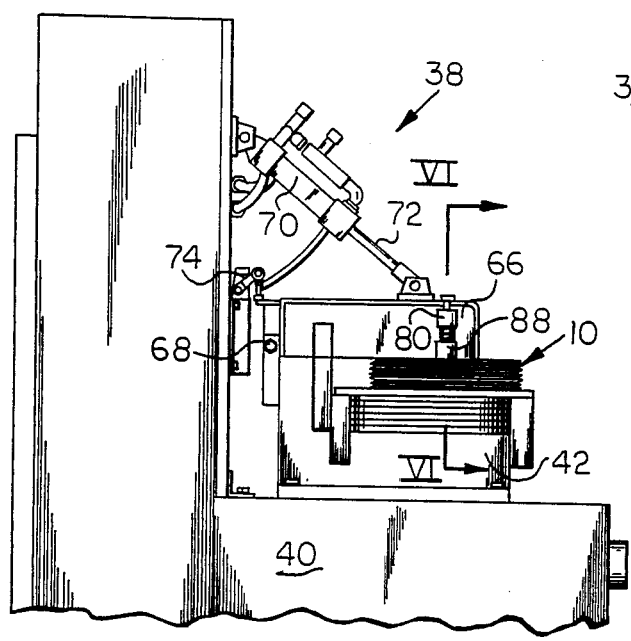
FIG. 4 is a side, elevational view of the heating apparatus during induction heating of a vibration damper.
Figure 5:
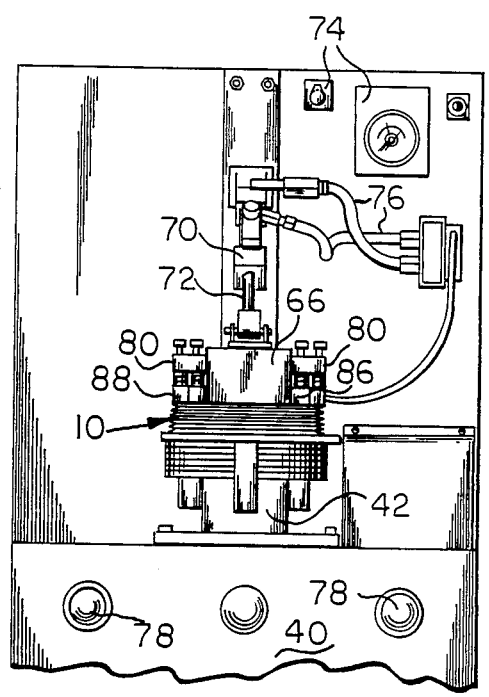
FIG. 5 is an elevational view of the apparatus of FIG. 4 as taken from the right of FIG. 4.
Figure 6:
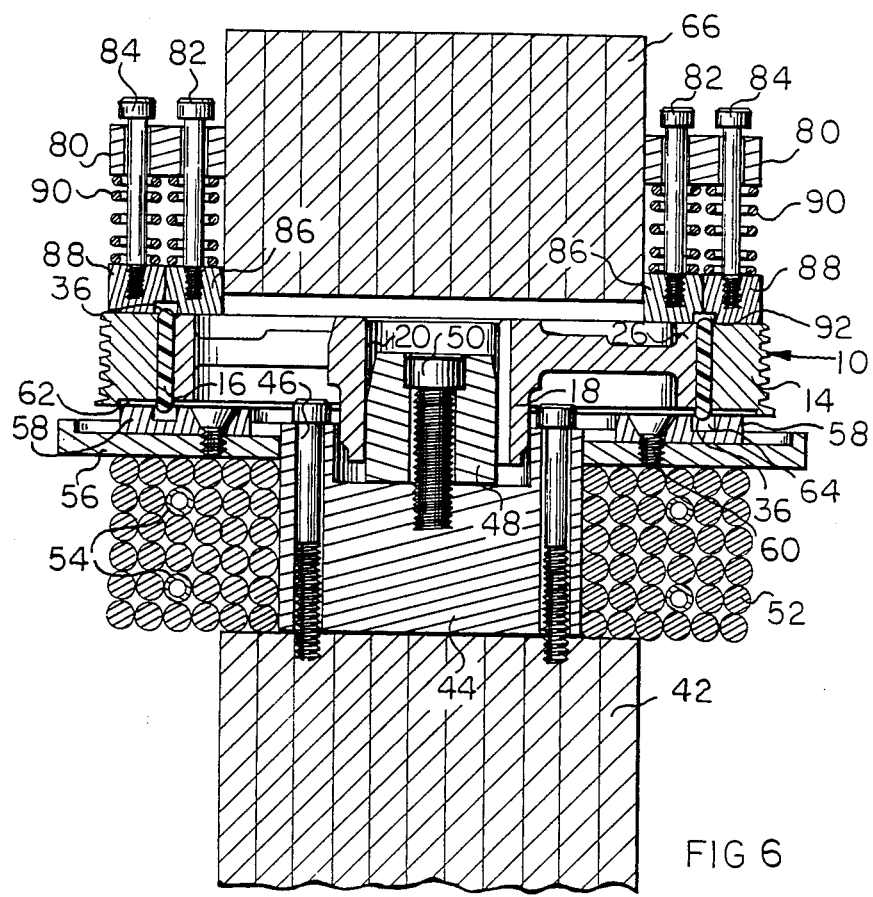
FIG. 6 is an elevational, sectional view as taken through the induction heating apparatus along Section VI—VI of FIG. 4.

The apparatus shown in FIGS. 4–6 includes a frame or cabinet 40 containing the necessary transformers, controls, etc. to produce the electrical induction heating current. The heating apparatus includes a lower core block 42 supported on cabinet 40 having a central core post 44 bolted thereon by bolts 46. The core post includes a central cylindrical locating pin 48 mounted on the core post by screw 50, and the locating pin has a diameter slightly less than the hub bore 20.

An electrical conductor coil 52 is located upon the core block 42 about the core post 44 and includes cooling tubes 54 through which water may be circulated to cool the coil. An annular table 56 is located upon the coil 52 and a plurality of damper positioning pads 58 are mounted upon the table by screws 60. Each pad 58 includes an upper surface 62 having a groove 64 defined therein which is in alignment with the damper elastomer ring during heating, as later described.

The heating apparatus further includes an upper core block 66 hinged to the lower core block 42 by hinge pin 68, FIG. 4, whereby the upper core block 66 may be pivoted relative to the lower core block. Pivoting of the upper core block about pin 68 is accomplished through expansible chamber motor 70 which includes piston 72 and upon extension of the piston the upper core block will pivot in a clockwise direction, FIG. 4, to the closed and heating position shown in FIGS. 4–6, and when the piston 72 is retracted, the upper core block will pivot in a counterclockwise direction, FIG. 4, permitting the damper 10 to be placed upon the locating pin 48 and pads 58, or removed therefrom. Conventional controls, such as shown at 74, and hose connections 76 are utilized with the heating apparatus to produce the desired operation, and a pair of actuating button switches 78, FIG. 5, initiate the operation and provide the necessary safety precautions.

Upon each lateral side of the upper core block 66 is located a bracket 80 through which extend a pair of headed guide pins 82 and 84 for axial movement within the associated bracket. The guide pins 82 are each threaded into a hub locating block 86, while the guide pins 84 are each threaded into an inertia ring locating block 88, and compression springs 90 interposed between the brackets 80 about the guide pins bias the blocks 86 and 88 downwardly toward the coil 52 until limited by engagement of the head of the guide pins with the associated bracket 80.

As will be appreciated from FIG. 6, the blocks 86 and 88 are each recessed to define a groove 92 which is in opposed relationship to the groove 64 defined on the locating pads 58.

With the upper core block 66 "opened" the assembled, timed and balanced vibration damper assembly of FIG. 2 is placed upon the locating pads 58 and the locating pin 48 as shown in FIG. 6. The grooves 64 will be in alignment with the rubber ring 16 as shown in FIG. 6. In this position the bore 20 closely receives the locating pin 48 and the lower lateral side of the flange 26 and inertia ring 14 rest on the surfaces 62 of the pads. Thereupon, the expansible chamber motor 70 is actuated to extend piston 72 and close the upper core block 66 as shown in FIGS. 4–6. As the upper core block is lowered toward the lower core block 42, the hub engaging blocks 86 will engage the upper lateral edge of the hub flange 26, while the inertia ring engaging blocks 88 will engage the lateral side of the inertia ring 14 as apparent from FIG. 6, compressing springs 90. The grooves 92 will align with the upper lateral edge 36 of the elastomeric ring 16.

The clamping blocks 86 and 88 will firmly hold the hub flange 26 and inertia ring 14 upon the locating pads 58, and with the upper core block pivoted to the fully closed position, the hub and inertia ring are firmly clamped relative to each other to prevent axial displacement therebetween.

After the damper 10 has been firmly clamped between the upper and lower core blocks, switch buttons 78 are actuated to initiate the induction heating step. During induction heating, a high alternating current of 240 volts, 60 Hz, is introduced to the coil 52. In one commercial embodiment of the invention such current is maintained for 29 seconds.

The size of the coil 52 is related to the dimensions of the vibration damper being heated, and the coil is radially positioned relative to the axis of the vibration damper so that the primary heating occurs within the inertia ring 14. However, heating of the flange 26 will also occur, but to a lesser extent. Preferably, the inertia ring 14 will heat to a little over 300° F. while the hub flange will be heated to a little over the adhesive bonding temperature, and by conduction the elastomeric material of the ring will usually be heated slightly over the adhesive bonding temperature, the greatest temperatures of the elastomer occurring adjacent the surfaces 28 and 30 at the location of the adhesive.

During heating, the elastomer ring 16 will tend to expand in the axial direction of the damper. This expansion is permitted to occur freely due to the presence of the grooves 64 and 92, and the extent of the expansion of the elastomer is not restricted during heating. By permitting the elastomer to expand localized stresses therein are not produced and concentricity between the inertia ring and hub is maintained during the heating procedure.

After heating is completed, the piston 72 is retracted pivoting the upper core block 66 counterclockwise, FIG. 4, and permitting the vibration damper 10 to be removed from the induction heating apparatus 10. The damper is placed within shipping boxes or bins, and permitted to cool to room temperature, and no further gaging or machining operations to the damper are required.

It will be appreciated that in the practice of the invention the clamping of the hub 12 and inertia ring 14 automatically occurs prior to heating, and separate clamps and clamping operations are not required, as was the case with the previous heating process utilizing an oven. Because only those portions of the vibration damper adjacent the elastomer, and adhesive, are heated, energy costs are substantially reduced as compared to the previous assembly process and the likelihood of eccentricity of the inertia ring on the hub occurring during heating is substantially reduced and checking for eccentricity and run out after heating is no longer required. Also, as the practice of the invention eliminates waiting for the damper to cool so that secondary operations can be performed thereon, the manufacturing and processing time is substantially reduced.

An important advantage derived from the invention results from the reduced time that the elastomeric material is exposed to relatively high temperatures, and elastomer aging is reduced resulting in a superior damper having an extended effective life. As the maximum temperature to which the elastomer is exposed is at the adhesive or bond line, the induction heating method of the invention permits the most effective utilization of energy with the minimum adverse effect on the elastomer.

It is appreciated that various modifications to the inventive concepts may be apparent to those skilled in the art without departing from the spirit and scope of the invention.

I claim:

1. The method of assembly a vibration damper wherein the damper comprises a metal hub having an axis of rotation and a circular flange having an outer peripheral surface and lateral edges, a metal inertia ring concentric to the hub axis having lateral edges adjacent an inner surface which is in radial spaced concentric relationship to the hub peripheral surface and an elastomeric ring interposed between the hub peripheral surface and the inertia ring inner surface having lateral ends, the elastomeric ring being under compression and frictionally engaging the hub and inertia ring surfaces comprising the steps of:

(a) applying a thermosetting adhesive having a bonding temperature to the hub outer peripheral surface and to the inertia ring inner surface,
    (b) concentrically radially aligning the hub peripheral surface and the inertia ring inner surface to define an annular cavity between the surface,
    (c) inserting the elastomeric ring into the annular cavity compressing the elastomeric ring whereby the elastomeric ring frictionally engages the hub peripheral surface and the inertia ring inner surface producing an assembly of the hub, inertia ring and elastomeric ring,
    (d) mechanically engaging and clamping only the lateral edges of the hub and inertia ring to maintain a predetermined relative radial and axial relationship therebetween while maintaining the elastic ring lateral ends free and unconfined to permit axial expansion of the elastic ring during heating,
    (e) inducing a low-frequency high-current alternating electrical current flow within the hub adjacent its flange peripheral surface and within the inertia ring adjacent its inner surface while the lateral edges of the hub and inertia ring are clamped to heat the flange peripheral surface and the inertia ring inner surface to a temperature sufficient to bond the thermosetting adhesive thereto and to the elastomeric ring,
    (f) releasing the lateral edges of the hub and inertia ring, and
    (g) permitting the bonded damper assembly to cool to room temperature.

2. In the method of assembling a vibration damper as in claim 1 wherein the induced electrical current has a frequency of approximately 60 Hz.

* * * * *